United States Patent [19]
Daffron

[11] Patent Number: 4,579,351
[45] Date of Patent: Apr. 1, 1986

[54] DUAL SPRING EXPANDER FOR OIL CONTROL PISTON RINGS

[75] Inventor: Vernon M. Daffron, Ellisville, Mo.

[73] Assignee: TRW Automotive Products, Inc., Cleveland, Ohio

[21] Appl. No.: 708,216

[22] Filed: Mar. 5, 1985

[51] Int. Cl.⁴ .............................................. F16J 9/06
[52] U.S. Cl. .................................. 277/140; 277/141; 277/216
[58] Field of Search ............... 277/138, 139, 140, 141, 277/142

[56] References Cited

U.S. PATENT DOCUMENTS

| | | | |
|---|---|---|---|
| 2,833,604 | 6/1958 | Hunt | 309/43 |
| 3,172,672 | 3/1965 | Marien | 277/140 |
| 3,355,180 | 10/1965 | Hamm | 277/139 |
| 3,477,732 | 11/1969 | Warrick | 277/140 |
| 3,628,800 | 12/1971 | Prasse | 277/140 |
| 3,741,569 | 6/1973 | Mayhew | 277/140 |
| 3,762,728 | 10/1973 | Prasse | 277/140 |
| 4,408,770 | 10/1983 | Nemets | 277/140 |
| 4,429,885 | 2/1984 | Chiba | 277/140 |
| 4,468,040 | 8/1984 | Plant | 277/140 |

Primary Examiner—Robert I. Smith
Attorney, Agent, or Firm—Yount & Tarolli

[57] ABSTRACT

A spring expander for oil control piston rings incorporates two spring mechanisms. One spring mechanism produces circumferentially directed hoop stress in the expander body when the expander body itself is contracted. A second radially acting spring mechanism is provided by circumferentially spaced spring fingers which radially deflect. Because the two spring mechanisms act together, the expander has a combined spring rate which is lower than the spring rate of either the circumferential spring mechanism or the spring rate of the radial spring mechanism. The expander also has expansion stops which limit the radial expansion of the spring fingers, and thereby limit the expansion of the associated rail ring to reduce pop-out during assembly. Contraction stops limit radial contraction of the rail ring with respect to the expander and maintain a clearance between the expander and the cylinder wall.

21 Claims, 8 Drawing Figures

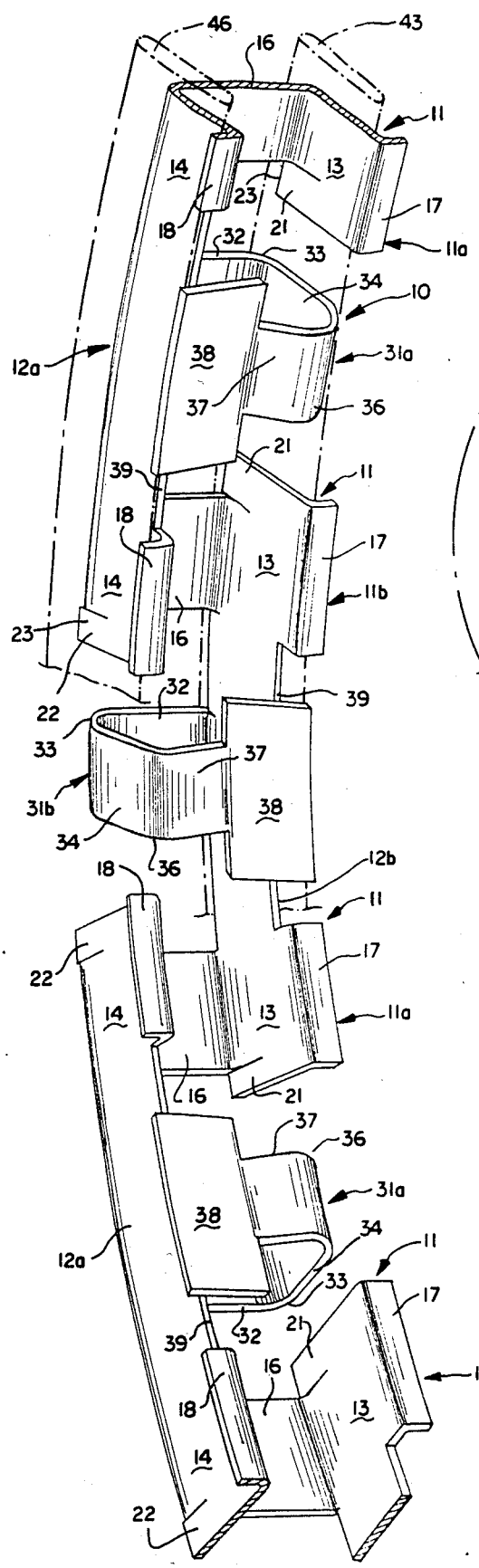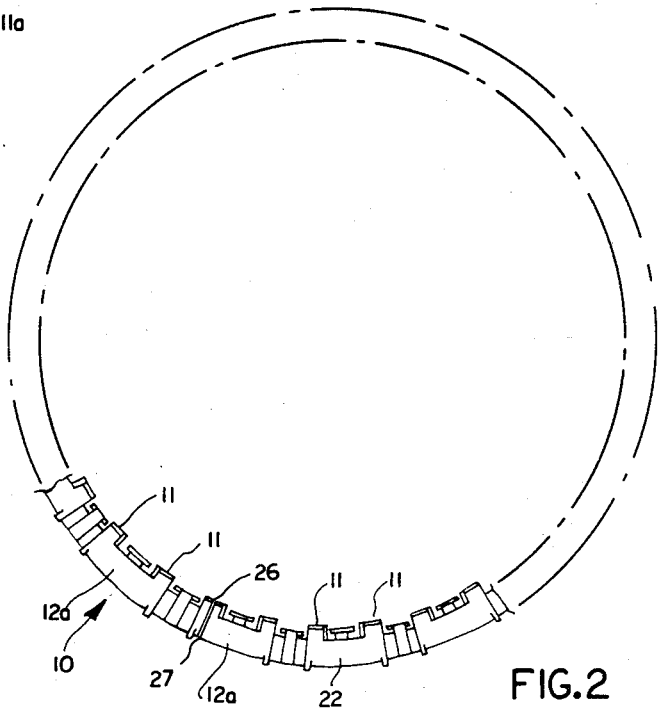
FIG. 1
FIG. 2

DUAL SPRING EXPANDER FOR OIL CONTROL PISTON RINGS

BACKGROUND OF THE INVENTION

This invention relates to an oil control piston ring assembly, and more particularly to an oil control piston ring assembly which includes at least one rail ring and a rail ring expander.

Oil control piston ring assemblies include a rail ring and an expander and are positioned within a piston ring groove. The expander positions the rail ring and resiliently urges it into engagement with an adjacent cylinder wall. Examples of assemblies of rail rings and expanders are illustrated in U.S. Pat. Nos. 2,833,604; 3,172,672; 3,355,180; 3,477,732; 3,628,800; 3,741,569; and 3,762,728. In some expanders, the expander spring force is created by circumferentially spaced spring fingers which deflect radially and apply a radially directed, resilient force to the rail ring. In other expanders, the resilient force is created by circumferential or hoop stresses in the ring which resist circumferential contraction of the expander.

Many oil control piston ring assemblies include a pair of rail rings and an expander. If the expander is of the type which circumferentially contracts and expands in response to dimensional changes such as wear of the rail rings or a varying cylinder diameter, a loss of oil control can occur. For example, this loss of oil control can occur when one rail ring applies a force to the expander to cause contraction of the expander and, as a result, the other rail rings loses its loading on the cylinder wall. Only one rail ring is then functioning to provide oil control when two rail rings should be functioning, and thus oil control is detrimentally affected.

Oil control piston ring assemblies having expanders with spring fingers which apply a radially directed spring force to a pair of rail rings also are subject to loss of oil control. In such assemblies, the rail rings can contract independently of each other. Thus, loss of oil control, as occurs when circumferentially contractible expanders are used, is avoided. However, the spring fingers have a relatively high spring rate. Thus, as the deflection of the spring fingers diminishes due to wear of the rail rings, for example, the radially directed force applied by the spring fingers is significantly reduced. The force reduction reduces the unit pressure between the rail ring and the cylinder wall, which permits oil to pass more easily between the ring and the wall. Thus, oil control is significantly detrimentally affected.

One of the patents listed above, namely U.S. Pat. No. 3,628,800, describes and illustrates an expander ring which is circumferentially expandable and contractible to supply a first resilient force urging portions of the expander ring itself into contact with the cylinder wall and which includes spring fingers that deflect radially to supply a second resilient force urging a rail ring into engagement with the cylinder wall. The two resilient forces function in an independent manner. The first force causes direct engagement between the wiping portions of the expander and the cylinder wall, while the second force acts on the rail ring. The first force normally does not affect the force on the rail ring, which is determined solely by the spring fingers.

SUMMARY OF THE INVENTION

The present invention is an improved spring expander for oil control piston rings in which two spring mechanisms act together in series to provide a resilient biasing force to one or more rail rings. The two spring mechanisms consist of the circumferentially contractible and expandable body of the expander and radially defelectable fingers that project from the expander body. The combined spring rate of the system in which the two spring mechanisms work is less than the spring rate of either of the spring mechanisms. Because the spring rate of the system is low, the force of engagement between the cylinder wall and the rail ring does not change appreciably when dimensional changes occur from heat, wear, or for any other reason.

The spring expander of the present invention does not have the aforementioned problem of the spring expanders of the art which use radially acting spring fingers to bias rail rings into engagement with the cylinder wall. Specifically, the spring expander of the present invention does not cause a significant reduction in pressure between a rail ring and the cylinder wall due to wear of the rail ring. Also, the rail rings are biased radially outwardly by a plurality of spring fingers acting radially, and the rails can move independently. Thus, the spring expander of the present invention does not have the aforementioned problem of the spring expanders which are circumferentially contractible.

The expander of the present invention also incorporates expansion stops to limit the radial expansion of the rails by the expander spring fingers. Such stops minimize the possibility of pop-out of the rails during installation of a piston in an engine block, and provide positive positioning of the radially deflectable fingers during manufacture of the expander so as to provide better control of the spring rate of the spring fingers.

Further, contraction stops are provided on the expander to engage and limit inward movement of a rail ring with respect to the expander. After the rail ring engages the stops, further radial contraction of the rail ring produces a similar amount of expander contraction. Thus, the contraction stops control the expander-cylinder wall clearance. These stops are located so that the expander will not contact the cylinder wall.

BRIEF DESCRIPTION OF THE DRAWINGS

The foregoing and other aspects of the invention will be more fully understood by those skilled in the art from a reading of the following specification made with reference to the accompanying drawings in which:

FIG. 1 is a perspective view of a portion of an expander in accordance with this invention, illustrating the relationship between the various parts of the expander;

FIG. 2 is a side elevation of the expander ring at a reduced scale;

DETAILED DESCRIPTION OF THE DRAWINGS

Figure 3:
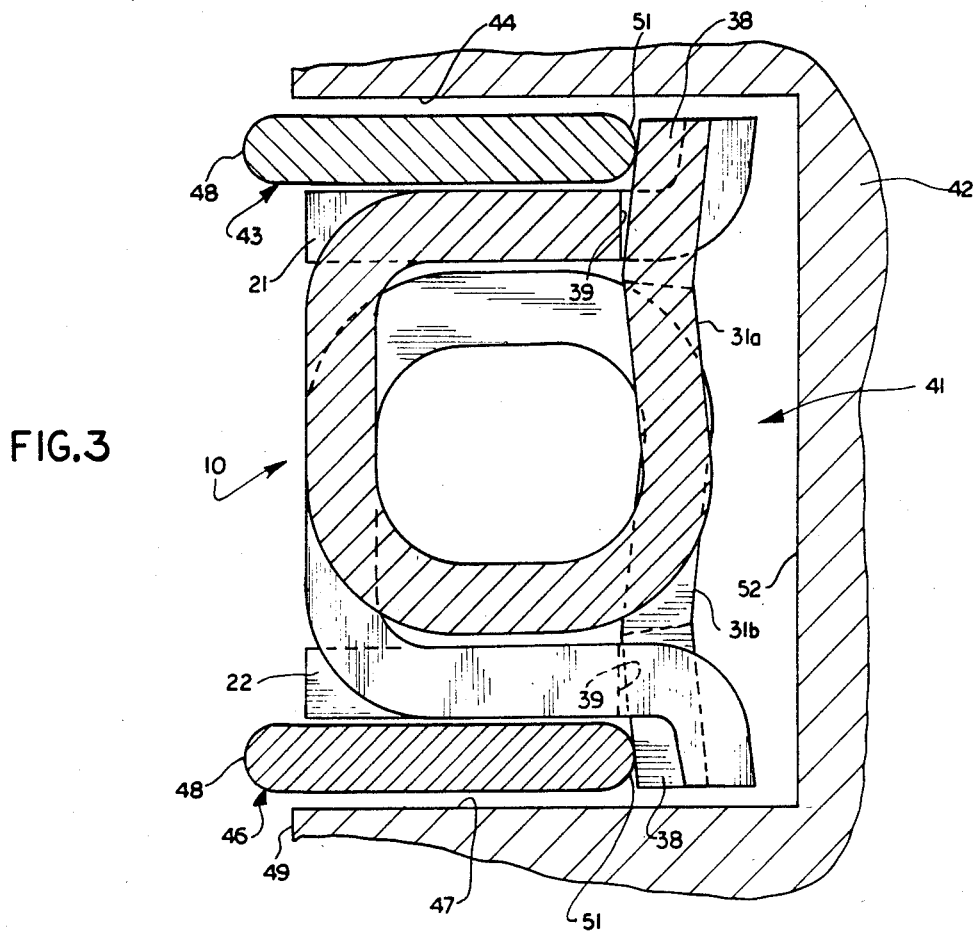
FIG. 3 is a fragmentary section illustrating the position of the rail rings and expander within a piston ring groove before the piston is installed within a cylinder.

The structural detail of a spring expander ring 10 embodying the present invention is best illustrated in FIG. 1, in which a portion of a full ring is illustrated. The expander ring 10 has a plurality of circumferentially spaced, generally U-shaped segments 11 which are connected together by connector straps 12a, 12b. Each of the segments 11 includes a pair of spaced apart and parallel radially extending legs 13 and 14 which are joined at the radially outer periphery of the expander by axially extending cross portions 16 which constitute the base of the U. The radially inner extremities of each of the legs 13 and 14 are bent axially in opposite directions to provide inner or contraction stops 17 and 18, with the stop 17 of the leg 13 extending in a direction away from the leg 14 and the stop 18 of the leg 14 extending in a direction away from the leg 13. The function of the stops is discussed in detail below.

Each leg 13 and 14 also has a radially extending projection 21 and 22, respectively, which extends to an outer edge 23 having a radius substantially equal to the maximum radius of the cross portions 16. These projections provide support for the rail rings, as discussed below.

Alternate segments 11 have identical structures and adjacent segments 11 are mirror opposites. For example, the segments 11a are all identical, but mirror opposites of the segments 11b. The connector straps 12a connect only the legs 14 of the adjacent segments and connector straps 12b connect only the legs 13. Further, the connector straps 12a and 12b are not continuous around the expander ring. The legs 13 of two adjacent segments 11 connected by a connector strap 12a are not connected and, similarly, the legs 14 of segments joined by a connector strap 12b are not connected. In other words, the connector straps 12a, 12b are staggered, first on one side of the expander ring and then along the opposite side of the expander ring, so that a space or opening is provided opposite each connector strap. With this structure, the expander ring can be contracted circumferentially. When such occurs, circumferentially directed stresses are imposed on the material of the expander ring.

The connector straps 12a and 12b and segments 11 constitute a circumferential spring mechanism in which circumferential or hoop stresses are imposed by circumferential contraction of the expander ring. As best illustrated in FIG. 2, the expander ring is circular in shape, extending from a first end 26 around the circle to a second end 27. For purposes of illustration, the two ends 26 and 27 are spaced apart a small distance in FIG. 2. In use, however, the two ends abut so that when forces are applied to the expander causing circumferential contraction thereof they are resisted in a resilient manner.

The expander ring 10 also has a second spring mechanism which functions in a radial manner. The radial spring mechanism is provided by a plurality of circumferentially spaced spring fingers 31a and 31b. The spring fingers 31a are supported by the connector straps 12a and the spring fingers 31b are supported by connector straps 12b. The structure of the spring fingers 31a is identical to but opposite the structure of the spring fingers 31b, so a description of the physical structure of a spring finger applies equally to both finger structures 31a and 31b.

Each spring finger has an axially directed outer portion 32 joined to the adjacent connector strap 12a or 12b at one end and extending to a radiused bend 33. From the bend 33, an inwardly directed portion 34 of the finger extends radially inward to a second radiused bend at 36. From the bend 36, the finger extends along an inner axially directed portion 37 generally parallel to the outer axial portion 32 so that the finger has a generally U-shaped construction. The free end 38 of the inner axial portion 37 is wider than the remaining portion of the finger and extends axially past the associated connector strap 12a or 12b. The radially inner edge 39 of the associated connector strap 12a or 12b constitutes an outer or expansion stop which is engageable by the finger end 38 to limit the outward movement of the finger end 38.

Each spring finger is formed so that if no radially inwardly directed forces are applied to the finger, the finger end 38 engages the adjacent edge 39 of the associated connector strap 12a or 12b to position the finger end. When sufficient radially inward force is applied to the finger, however, the finger end 38 deflects radially inwardly away from the associated edge 39. The spring fingers 31a and 31b constitute a radial spring mechanism which functions together in series with the circumferential spring mechanism provided by the basic expander structure. The illustrated expander 10 is intended for use with two rail rings 43 and 46 (illustrated in phantom in FIG. 1) located on opposite sides of the expander and actually provides two similarly acting radial spring mechanisms which are both in series with the circumferential spring mechanism. Each rail ring 43, 46 is a circular ring with a gap in the ring. Because of the gaps, the rings are radially contactible.

Figure 4:
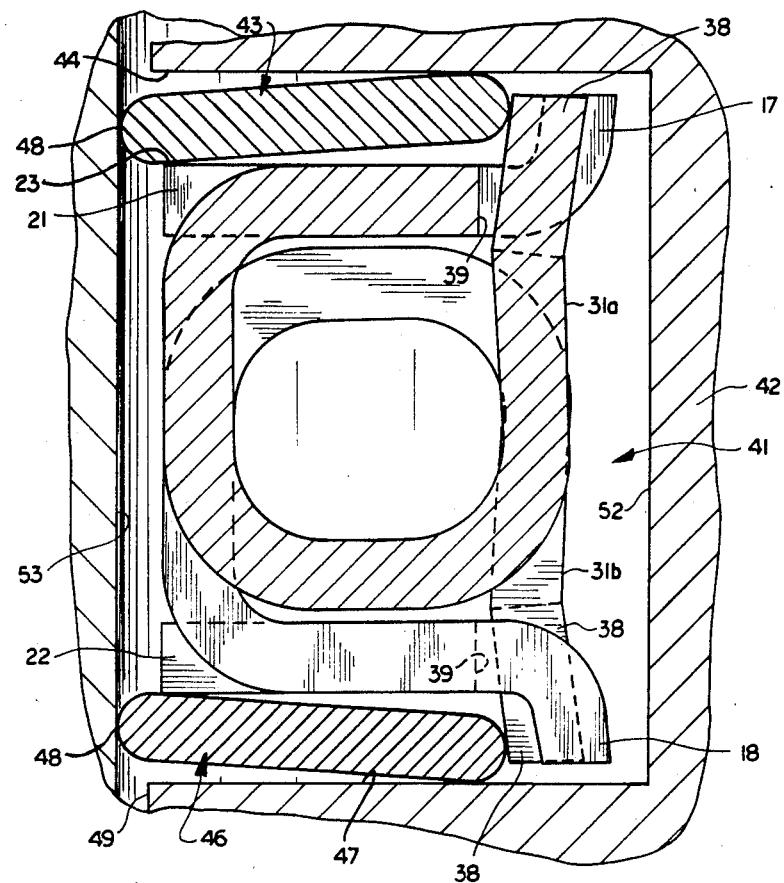
FIG. 4 is a fragmentary section, similar to FIG. 3, of an installed rail ring-expander assembly in its normal operative condition.
Figure 5:
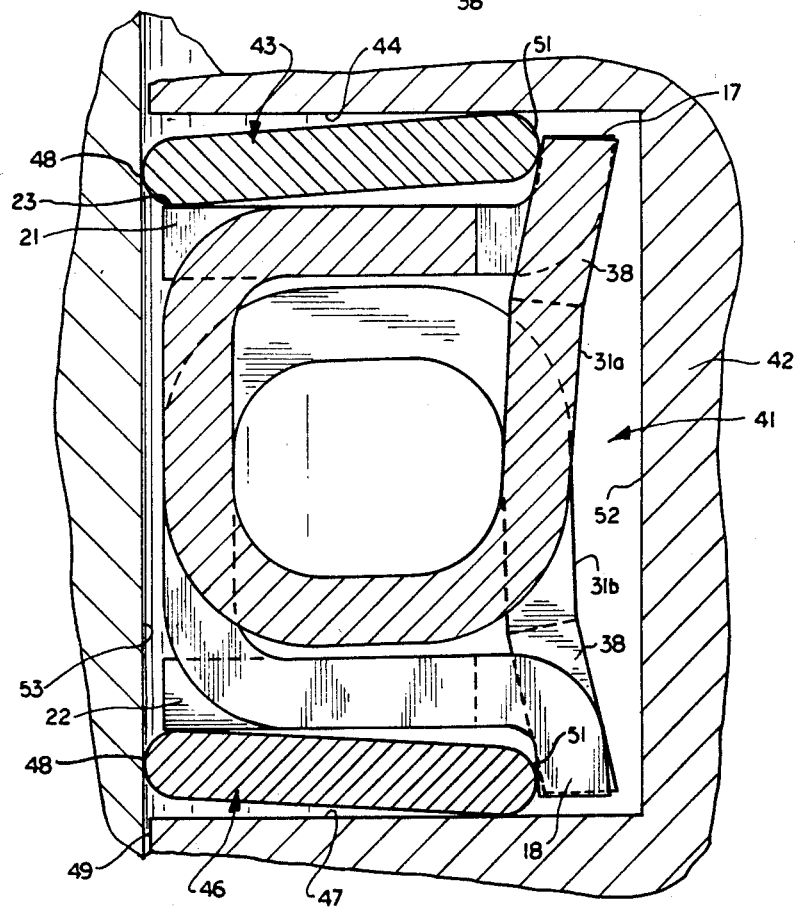
FIG. 5 is a fragmentary section similar to FIG. 3, but illustrating the rail ring-expander assembly in a position in which the rail rings have bottomed out against the contraction stops to prevent excessive radial inward movement of the rail rings with respect to the expander.

When an expander in accordance with the present invention is combined with a pair of rail rings and is installed within a piston ring groove of a piston, three different conditions can exist, which are illustrated in FIGS. 3 through 5. As illustrated, an expander-rail ring assembly is positioned within a piston ring groove 41 of a piston 42. The expander ring 10 is installed with an upper rail ring 43 positioned between one side of the expander 10 and the upper wall 44 of the groove. A lower rail ring 46 is installed between the other side of the expander 10 and a lower wall 47 of the groove 41.

In FIG. 3, the assembly is illustrated prior to installation of the piston within a cylinder. The rail rings 43 and 46 are in their maximum radially extended position. In such position, the radially outer edges 48 of the rail rings 43 and 46 project a small distance beyond the radially outer periphery 49 of the piston 42 and the radially inner edges 51 of the rail rings are seated against the associated finger ends 38. Each finger end 38 engages its associated inner stop edge 39 and thus cannot cause further expansion of the associated rail ring 43 or 46. The expander ring also assumes its maximum unstressed circumference, which is selected to provide the maximum extension of the rail rings and to provide a clearance between the radially inner surfaces of the expander ring and the inner wall 52 of the groove 41. Because the two rail rings 43 and 46 project only a small distance beyond the periphery 49 of the piston 42, the tendency for pop-out to occur during the installation of the piston within the cylinder is virtually eliminated.

After the piston 42 is installed within the cylinder bore 53, the various elements assume a normal condition and position illustrated in FIG. 4. The rail rings 43 and 46 are contracted a small amount by the engagement of their outer edges 48 with the cylinder wall 53. Contraction of the rail rings causes deflection of the associated finger ends 38 radially inward away from their associated inner stop edges 39, so the fingers actually apply a radially directed resilient force urging the rail rings into engagement with the cylinder wall 53. In addition, the main body of the expander ring is circumferentially contracted by the contraction of the rail rings, which reduces the clearance between the radially inner surfaces of the expander ring and the inner wall 52 of the piston ring groove 41. Also, the spring fingers are angled in such a manner that they apply a force component on the rail rings 43, 46 urging the rail rings into engagement with the side walls of the piston groove. Thus, the rails take the position illustrated in which the rails engage the sidewalls of the piston groove, the edges 23 of the projections 21 and 22, and the cylinder wall 53.

The condition of FIG. 4 is the normal operating condition of the assembly, in which the two spring mechanisms, namely, the radial spring mechanism provided by the fingers 31 and the circumferential spring mechanism provided by the body of the expander, act together in series and deflect with a relatively low combined spring rate, as discussed in greater detail below.

The final possible operating condition of the rail ring-expander assembly is illustrated in FIG. 5. In the condition of FIG. 5, the cylinder wall 53 is very close to the outer surface 49 of the piston 42. The condition can occur due to excessive temperatures or because of abnormal loading on the engine components which results in cocking of the piston in the cylinder 3. In FIG. 5, the rail rings 43 and 46 are contracted until their inner edges 51 engage the associated inner stops 17 and 18 to prevent further contracting movement of the rail rings with respect to the expander ring. In addition, the spring fingers 31a and 31b are deflected a maximum amount and any further contraction of the rail rings results in direct circumferential contraction of the expander body itself. When this occurs, the expander applies a spring rate to the rail rings determined entirely by the circumferential spring action of the expander.

Figure 6A:
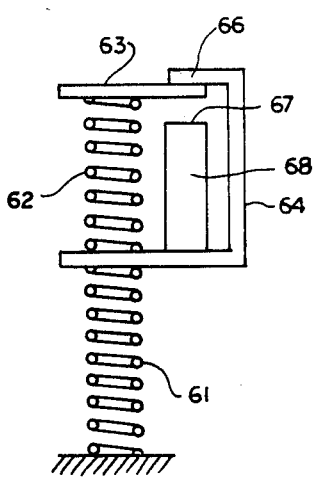
FIG. 6a is a schematic representation of the spring system of an expander in accordance with this invention illustrated in its maximum extended position, which corresponds to FIG. 3.
Figure 6B:
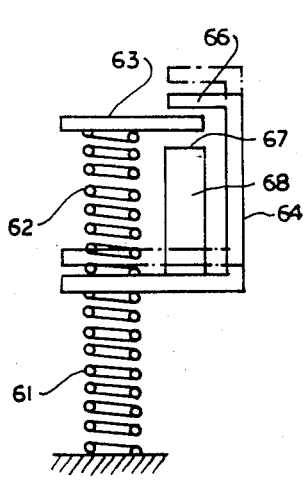
FIG. 6b is a schematic representation of the spring system similar to FIG. 6a but illustrating the expander condition which exists during normal operation when the parts of the rail ring-expander assembly are in the position of FIG. 4.
Figure 6C:
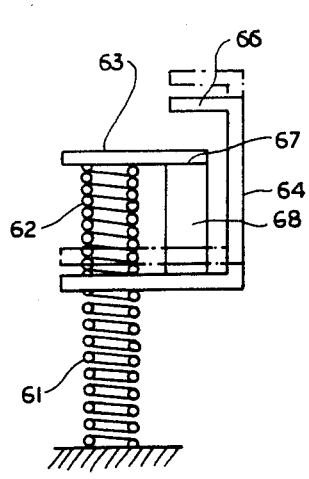
FIG. 6c is a schematic representation of the spring system similar to FIG. 6a, but illustrating the condition which exists when the rail rings bottom out as illustrated in FIG. 5.

FIGS. 6a through 6c schematically represent the spring system provided by the expander ring of the present invention. The system includes an inner spring 61 which represents the circumferential spring mechanism of the expander ring and an outer spring 62 which represents the radial spring mechanism provided by the fingers. The rail rings are represented by a plate 63 which engages the upper end of the spring 62. The U-shaped part 64 includes a stop portion 66 which corresponds to the stop surfaces 39 and which limits the expansion of the outer spring 62. The inner stops 17 and 18 are represented by the top 67 of a post 68 carried by the U-shaped part 64. The inner stop 67 limits the downward movement of the plate 63 with respect to the U-shaped part 64, and thereby limits the compression of the outer spring 62.

FIG. 6a illustrates the same condition as that illustrated in FIG. 3. Specifically, the maximum extension of the spring 62 is controlled by the stop 66. During normal operation, as illustrated in FIG. 6b, the plate 63 is moved downwardly, representing the compression of the rail rings 43 and 46. This causes compression of both of the springs 61 and 62 so that the effective spring rate is a function of the combined compression of both springs 61 and 62.

When the plate 63 representing the rail rings moves inwardly until the stop 67 is engaged, further compression of the upper spring 62 cannot occur, and the expander ring system compresses the spring 61. This is the condition of FIG. 5 and FIG. 6c.

When two springs are compressed together in series, the combined spring rate of the system is determined by the equation:

$$K_C = \frac{K_1 \times K_2}{K_1 + K_2}$$

where
$K_C$ is the combined spring rate,
$K_1$ is the rate of a first spring, and
$K_2$ is the rate of a second spring.

Consequently, the combined spring rate is always less than the spring rate of either of the two springs which are acting together in series. With an expander ring in accordance with the present invention, in which two spring mechanisms act together in series during normal operation to provide the spring bias on the rail rings, a relatively low spring rate can be achieved even though the two spring mechanisms each have relatively high spring rates.

It is desirable to provide a relatively low expander spring rate because the associated changes in force which occur between the rail rings and the cylinder wall when dimensional changes such as wear occur, are not as great as the changes in force which would occur if the system had a relatively high spring rate. Since the spring force does not change appreciably, unit pressures between the rail rings and cylinder wall do not appreciably change and oil control is maintained.

Further, since the rail rings bottom out against the inner stops when excessive rail ring contraction occurs, the expander ring is maintained in a position spaced from the cylinder wall and is not damaged by engagement therewith.

The expander ring is preferably manufactured by die cutting a strip of metal and then bending the various parts to the illustrated shape. Because the spring fingers are bent into engagement with the associated stop edge 39, it is relatively easy to produce the desired spring rate for the fingers.

Although the illustrated embodiment of the present invention has two rail rings, this invention is equally applicable to an expander ring assembled with only one rail ring. Also, although the preferred embodiment of this invention has been shown and described, it should be understood that various modifications and rearrangements of the parts may be resorted to without departing from the scope of the invention as disclosed and claimed herein.

What is claimed is:

1. An expander for use with a rail ring in an oil control piston ring assembly, said expander comprising:

means defining a circumferential spring mechanism having a first spring rate, said circumferential spring mechanism including an annular body that can be circumferentially contracted to produce circumferential stresses in said body and to apply a first radially directed spring force to the rail ring; and means defining a radial spring mechanism having a second spring rate, said radial spring mechanism including a plurality of radially acting springs circumferentially spaced apart around said body and operable to engage and apply a second radially directed spring force to the ring rail;

the first and second radially directed spring forces resisting radial and circumferential contraction of the ring rail, the circumferential spring mechanism and the radial spring mechanism being operable together in series so that the expander has a combined spring rate which is less than either of the first and second spring rates.

2. An expander as set forth in claim 1 further comprising expansion stop means engageable by the radially acting springs for limiting radial and circumferential expansion of the rail ring by the radially acting springs.

3. An expander as set forth in claim 2 further comprising contraction stop means for limiting circumferential contraction of the rail ring with respect to the expander.

4. An expander as set forth in claim 1 further comprising contraction stop means for limiting circumferential contraction of the rail ring with respect to the expander.

5. An apparatus comprising:
a piston having a piston ring groove;
a cylinder enclosing said piston and providing a cylinder wall adjacent said piston; and
an oil control piston ring assembly in said piston ring groove;
said oil control piston ring assembly including at least one rail ring positioned within said groove and engaging said cylinder wall, and an expander ring spaced radially from said cylinder wall and applying a spring force to said rail ring urging said rail ring into engagement with said cylinder wall;
said expander ring incorporating a first spring mechanism having a first spring rate and a second spring mechanism having a second spring rate, said first and second spring mechanisms acting together in series to provide a combined spring force resisting contraction of said rail ring, said first and second spring mechanisms also having a combined spring rate which is less than either of said first and second spring rates.

6. An apparatus as set forth in claim 5, wherein said piston ring assembly includes two axially spaced rail rings with one positioned on each side of said expander and located within said piston ring groove by said expander.

7. An apparatus as set forth in claim 5, wherein said expander includes contraction stop means for limiting the contraction of said rail ring with respect to said expander and to maintain a space between said expander and said cylinder wall.

8. An expander for applying a radial force to at least one rail ring in an oil control piston ring assembly, said expander comprising:
(a) an annular expander body;
(b) a plurality of radially deflectable spring fingers disposed in circumferentially spaced apart relation around the expander body, the spring fingers being operable to apply a spring force radially to an inner edge of the rail ring and to resiliently resist circumferential contraction and resultant radially inward movement of the rail ring;
(c) means defining at least one expansion stop for limiting radially outward movement of the spring fingers to a predetermined maximum position and thereby limiting the radially outward movement of the rail ring by the spring fingers; and
(d) means defining at least one contraction stop for limiting circumferential contraction of the rail ring with respect to the expander body to a predetermined position;
the expander body being circumferentially expandable and contractible and acting with said spring fingers to resist circumferential contraction of the rail ring.

9. An expander as set forth in claim 8 wherein said at least one contraction stop is disposed to engage the rail ring to limit circumferential contraction of the rail ring with respect to the expander body.

10. An expander as set forth in claim 8 wherein the spring fingers project axially from both sides of the expander body, and said at least one contraction stop includes at least two contraction stops for resisting circumferential contraction of rail rings located on both sides of the expander body.

11. A expander as set forth in claim 8 wherein the expander body, the spring fingers, the at least one expansion stop, and the at least one contraction stop are all formed from a single strip of material.

12. An expander as set forth in claim 8 wherein the expansion stop defining means comprises a radially inner edge of the expander body.

13. An expander as set forth in claim 8 wherein the compression stop defining means includes an axially extending surface of the expander body.

14. An apparatus comprising:
an expander ring and at least one rail ring,
said expander ring having a plurality of circumferentially spaced segments providing a plurality of radially extending legs engaging one side of said rail ring;
connecting portions interconnecting and cooperating with said segments to provide a circumferential spring resiliently resisting radially inward movement of said segments,
said expander also having a plurality of circumferentially spaced radially acting spring fingers engaging an edge of said rail ring and providing radial spring forces resiliently resisting radial contraction of said rail ring;
said rail ring being circumferentially contractible to radially deflect said spring fingers and through said spring fingers to move said segments radially inward; and
said segments having contraction stops engageable with said rail ring to limit the radial inward movement of said rail ring with respect to said segments.

15. An apparatus as set forth in claim 14, wherein said expander ring has expansion stop means engageable by said spring fingers to limit the radially outward movement of said spring fingers.

16. An apparatus as defined in claim 14 wherein said circumferential spring has a first spring rate and said radially acting spring fingers have a second spring rate, said expander providing a spring force on said rail ring and having a combined spring rate less than either of said first and second spring rates, changes in spring force applied to said rail ring resulting from dimensional changes being determined by said combined spring rate rather than by either said first or said spring rates independently.

17. An apparatus as set forth in claim 15, wherein said contraction stops limit the contraction of said rail ring with respect to said expander and thereafter provide further spring force on said rail ring due only to contraction of said circumferential spring.

18. An expander for use with at least one rail ring in an oil control piston ring assembly, said expander comprising:
  (a) a plurality of circumferentially spaced segments disposed in an annular array and providing a plurality of radially extending legs engaging one side of said rail ring;
  (b) a plurality of connecting portions interconnecting and cooperating with said segments to provide a circumferential spring resiliently resisting radially inward movement of said segments; and
  (c) a plurality of circumferentially spaced, radially acting spring fingers positioned to engage an edge of said rail ring and providing radial spring forces resiliently resisting circumferential contraction of said rail ring;

said circumferential spring having a first spring rate and said radially acting spring fingers having a second spring rate, said expander providing a spring force on said rail ring and having a combined spring rate less than either of said first and second spring rates, whereby changes in spring force applied to said rail ring which result from wearing of the rail ring are determined by the combined spring rate rather than by either of said first and second spring rates independently.

19. An expander as set forth in claim 18 wherein the connecting portions include expansion stops engageable by said spring fingers to limit radially outward movement of said spring fingers.

20. An expander as set forth in claim 18 wherein said segments include contraction stops engageable with said rail ring to limit radially inward movement of said rail ring with respect to the segments.

21. An expander as set forth in claim 19 wherein said segments provide contraction stops engageable with said rail ring to limit circumferential contraction of said rail ring with respect to said expander and thereafter provide further spring force on said rail ring due only to circumferential contraction of said circumferential spring.

* * * * *